United States Patent Office 3,595,904
Patented July 27, 1971

3,595,904
MONOALKYL FUMARATES OF TETRACYCLINE COMPOUNDS
Albert E. Timreck, Rego Park, N.Y., and Helmut W. Raaf, Karlsruhe-Waldstadt, Germany, assignors to Pfizer Inc., New York, N.Y.
No Drawing. Filed May 18, 1967, Ser. No. 639,281
Int. Cl. A61k 21/00; C07c 103/19
U.S. Cl. 260—485                                    9 Claims

ABSTRACT OF THE DISCLOSURE

Monoalkyl fumarate compounds of medicaments containing basic or quaternary nitrogen atoms are quite insoluble and are useful in sustained release and tasteless dosage forms such as chewable tablets, suspensions, suppositories and depot injectables. Insolubility prevents unpleasant taste from becoming apparent while the tablet is ingested and enhances sustained release characteristics. Suitable medicaments include antibiotics, vitamins and central nervous system regulators.

BACKGROUND OF THE INVENTION

This invention relates to novel pharmaceutical preparations, namely to useful compounds formed from basic medicaments and certain monalkyl organic acid esters. These compounds are of value in oral and parenteral dosage forms of the said medicaments.

Oral administration of therapeutic agents has always been a preferred method in medical practice owing to its convenience. Unfortunately, many medicaments cannot be administered orally in simple form because of their objectionable taste. Consequently, particular dosage forms have been devised to improve the palatability of these medicaments.

These dosage forms include the use of suspensions, coated tablets and chewable tablets which incorporate sweeteners, flavorants and other pleasant tasting agents in order to mask the taste of the medicament. The addition of these agents may cause allergic effects in treated individuals or result in a tablet too large to be swallowed conveniently. Chewable tablets usually require large amounts of taste-masking ingredients and these may also cause undesirable side effects in some of the treated individuals. The compounds of this invention enable the preparation of oral dosage forms without the use of objectionable amounts of additional ingredients.

A sustained release effect, wherein the medicament is gradually released from the dosage form to the bloodstream and tissues of the treated individual, is often desired for a medicament which is administered parenterally. Such dosage forms are usually comprised of the medicament dissolved or suspended in a material, such as beeswax, peanut oil, sesame oil or a saturated hydrocarbon oil, which retains the medicament and gradually releases it to the surrounding tissues. Upon release of the medicament, the carrier or "depot" material remains in the body, at the site of injection, and is slowly absorbed by the body fluids and tissues. Subsequent to this absorption the "depot" material is excreted.

The "depot" method for parenteral administration of medicaments presents several inherent difficulties. Among these are the fact that some persons may present allergic reactions to the materials which have been used as carriers; the fact that a sterile abscess may form around the slowly-absorbed pocket of remaining carrier material; the fact that some carrier substances do not readily dissociate into harmless substances in the body; the fact that many of the carriers used in "depot" injectables are extremely viscous liquids and are consequently difficult to inject and the fact that some carriers do not release the medicament readily or completely. The compounds of this invention are useful as improved dosage forms for parenteral "depot" injectables. These new dosage forms do not possess many of the objectionable properties which are characteristic of the usual "depot" injectables.

The limited solubility of these new compounds also provides a means for attaining sustained release characteristics in oral dosage forms as well as in suppositories.

The salts of this invention may be used in improved dosage forms for parenteral "depot" injectables. The medicament is released gradually as the alkyl fumarate salt dissociates and the depleted "depot" decomposes into the corresponding alcohol and fumaric acid. These compounds are excreted easily and are harmless in the body.

The new salts of this invention are also useful as components of other dosage forms such as suspensions and suppositories. Their usefulness in these dosage forms is attributable to their relative insolubility and consequent sustained release characteristics.

SUMMARY OF THE INVENTION

The problems are overcome in accordance with the present invention by forming the compounds of monoalkyl fumaric acids containing from about 12 to 18 carbon atoms in the alkyl group with medicaments which contain one or more basic nitrogen groups or quaternary nitrogen groups. The monoalkyl fumaric acids having from about 14 to 18 carbon atoms in the alkyl group are especially preferred in performing this invention. More particularly, monostearyl fumaric acid is most suitable. While any medicament having the specified chemical structure is suitable, vitamins, antibiotics and central nervous system regulators are of particular interest.

The advantageous nature of these compounds derives from the surprising discovery that they exhibit very low water solubilities but dissociate or dissolve easily in acidic media such as the digestive fluids. Their limited aqueous solubility renders them particularly useful as dosage forms for the administration of the constituent medicaments. For example, they are useful in oral dosage forms such as tablets, chewable tablets and suspensions. Because of their relatively bland taste these dosage forms may be prepared without the use of excessive quantities of flavorants or sweeteners even where the medicament, as such, has an unpleasant taste. The new compounds are also useful as the active component of suppositories and "depot" injectables. As injectables, thye provide a dosage form which dissociates easily, is harmless to the body and possesses sustained release characteristics. Sustained release characteristics are also provided where these new compounds are used in oral dosage forms or suppositories.

DETAILED DESCRIPTION OF THE INVENTION

As previously stated, the new compounds of this invention are formed from certain nitrogen-containing medicaments and monoalkyl fumaric acids.

The alkyl group of the monoalkyl fumaric acid may contain from about 12 to 18 carbon atoms. The monoalkyl fumaric acids having from about 14 to 18 carbon atoms in the alkyl group are especially preferred in performing the invention. The most suitable monoalkyl fumaric acid is monostearyl fumaric acid which has been found to form salts with basic medicaments which are especially suited for use in the oral and parenteral dosage forms of this invention. Other alkyl fumaric acids which are especially useful are the monocetyl and monomyristyl fumaric acids.

The medicaments which are useful in forming the products of this invention are those which contain one or more basic nitrogen groups or quaternary ammonium groups.

By a basic nitrogen group is meant a substituent containing a nitrogen atom which is capable of accepting a proton. The proton-accepting nitrogen atoms include those bonded to one or two hydrogen atoms as well as those which are not bonded to any hydrogen atoms. By a quaternary ammonium group is meant a substituent containing a nitrogen atom which is bonded to four other atoms and which possesses a positive charge.

The suitable medicaments include a number of vitamins, antibiotics, and central nervous system regulators, among others. More particularly, thiamine, riboflavin; oxytetracycline, tetracycline, polymyxin, triacetyloleandomycin, neomycin, 6-deoxy-6-demethyl-6-methylene - 5 - oxytetracycline, α-6-deoxy-5-oxytetracycline, streptomycin; caffeine, oxyphencyclimine, amphetamine, hydroxyzine, meclizine and ephedrine have been found to be suited for use in this invention.

The processes for producing the materials which are the subject of this invention involve reacting in solution, the appropriate medicament or its acid addition salt with a monoalkyl fumaric acid or a salt thereof, preferably an alkali metal salt. A precipitate of the monoalkyl fumarate compound of the medicament is thereupon formed and may be separated from the mother liquors by filtration, decantation or other suitable means for accomplishing the separation. The precipitate, which may be washed, is then stored in a manner which will preserve it from decomposition.

The solvents in which the medicament and monoalkyl fumarate or monoalkyl fumaric acid are combined may be any reaction-inert solvent in which the monoalkyl fumarate compound of the medicament is only sparingly soluble. By reaction-inert is meant those solvents which are free from adverse effect on reactants and products under the conditions employed. The temperature at which the reaction is carried out should be selected so as to avoid any appreciable decomposition of the medicament and so that the precipitation of the product is substantially complete with only a small amount of unprecipitated medicament remaining. Agitation is often advisable for intimate mixing in order to promote complete precipitation.

Suitable solvents include water, lower alkanols such as methanol and isopropanol, as well as chloroform and mixtures of these solvents. Where sodium stearyl fumarate is used as the source of the monoalkyl fumarate, water, methanol or isopropanol or their mixtures are suitable solvents. Where oxytetracycline hydrochloride or thiamine are the medicaments, water may be used as the solvent. Where the antibiotic methacycline is the medicament, a mixture of water and isopropanol is appropriate. Where caffeine is used as the medicament, isopropanol or chloroform may be used.

The reactions involved in producing the products of this invention all involve the formation of a substituted ammonium salt with the monoalkyl fumarate union. Where the medicament already exists as the quaternary ammonium cation in solution, the formation of the product is merely a matter of anion substitution. Where the medicament contains an amino or similar basic nitrogen group, the quaternary nitrogen atom is formed first, after which salt formation occurs with the monoalkyl fumarate anion.

Some medicaments contain more than one nitrogen atoms may be basic or may be quaternary nitrogen atoms. Where more than one such nitrogen atom is present, one or more be caused to combine with the fumarate.

The materials which are the subject of this discovery may be exploited in several important and useful applications which are embodiments of this invention.

Where a basic medicament has an unpleasant taste in the uncombined form, a palatable dosage form can be produced using the monoalkyl fumarate compounds of the basic medicament as the source of the medicament. The dosage form is rendered palatable by the fact that the monoalkyl fumarate derivatives do not dissolve in the fluids of the mouth and, consequently, the unpleasant taste will not be experienced by the patient. The monoalkyl fumarate derivatives of the medicament will dissociate in the digestive fluids and, thereby, release the medicament in the body. The dosage form may be a solid uncoated tablet, a coated tablet, a coated or uncoated chewable tablet, a suspension of the solid in a flavorant liquid or a multi-layer tablet in which the outermost layer is intended to dissolve in the stomach and the inner layers are intended to be dissolved enterically.

In the case where the medicament is to be administered by injection and it is desired to maintain the medicament concentration in the bloodstream and tissues at a high level for relatively long periods subsequent to injection, the medicament can be administered in a dosage form consisting of a monoalkyl fumarate compound of the medicament in an injectable menstruum. The dosage form may also contain a portion of the medicament in a form which is released relatively soon after injection. Upon injection the rapidly released form of the medicament is liberated from the injected mass or "depot" and is absorbed into the tissues and blood to initiate therapeutic effect rapidly. The medicament which is in the form of a compound with the monoalkyl fumarate is released into the tissues and blood more slowly, the rate being controlled by the rate of dissolution of the monoalkyl fumarate compound of the medicament in the body fluids surrounding the point of injection. The slow release of the medicament permits a high concentration of medicament to be maintained in the body over a relatively long period. The alkyl fumaric acid or alkyl fumarate salt which remains after the medicament is released decomposes in the body into the corresponding alcohol and fumaric acid, both of which are readily excreted from the body without harm. The ability to decompose easily is important in this type of dosage form to avoid allergic reaction and the formation of sterile abscesses.

Another application for our invention is in the recovery of basic pharmaceutical compounds from solutions. By addition of a monoalkyl fumaric acid or an alkali metal salt thereof, the insoluble monoalkyl fumarate compound of the medicament is formed and separated. The extremely low aqueous solubility of the monoalkyl fumarate compounds of basic medicaments provides the means for an efficient recovery scheme with minimum loss of the valuable medicaments.

The monoalkyl fumaric acids and monoalkyl fumarates which may be used with this invention include those with an alkyl group having from 12 to 18 carbon atoms. The monoalkyl fumaric acids and monoalkyl fumarates having from 14 to 18 carbon atoms are preferred. Monostearyl fumaric acid, monocetyl fumaric acid, monomyristyl fumaric acid and the corresponding fumarates are preferred since these form precipitates which are handled easily and also decompose to harmless substances in the body. In particular, monostearyl fumarate, which decomposes to stearyl alcohol and fumaric acid, is especially preferred.

The monoalkyl fumarates used in this invention are readily produced by a number of methods. A three-step process may be advantageously employed. In the first step of the process, maleic anhydride is caused to react with the desired alkanol in the absence of a solvent, under substantially anhydrous conditions. An excess of the anhydride is desirable inasmuch as any free alkanol which remains may interfere with the final isomerization step of the process. The first step is usually effected at a reaction temperature between about 55° C. and 85° C. for a period of from about 0.5 to 10 hours. After reaction is complete the mixture is cooled to room temperature at which point solidification occurs. The entire solid mass consists of essentially pure monoalkyl maleic acid.

The second step of the process is effected by treating the monoalkyl maleic acid, in a finely-divided state, with an appropriate alkali metal hydroxide in an aqueous solvent system at a pH below 8.5. The dispersed state of the monoester, which is desirable in order to minimize any saponification reaction, is accomplished by milling the cold solid ester before suspending it in the aqueous reaction medium or by employing about 40% by volume of a water-miscible lower alkyl ketone in the aqueous reaction system. The concentration of the free ester should be as high as possible for high recovery. The alkaline material is preferably dilute and should be added slowly to avoid saponification of the monoester.

The final step of the process involves the isomerization, in aqueous solution, of the monoalkyl maleate salt to the corresponding fumarate. It is not necessary to isolate the maleate salt prior to this step. The isomerization reaction is accomplished by heating with a catalytic amount of water-soluble bromide-persulfate free radical initiator, at a temperature from 55–90° C. for a period of from about 15 minutes to about 2 hours. A combination of ammonium bromide and ammonium persulfate is an appropriate catalyst system.

The monoalkyl fumarate salt is formed by this three-step process in a yield of about 80% of theoretical, based on the alkanol.

It will be understood that various changes in the details, materials and steps, which have been herein described in order to explain the nature of the invention, may be made by those skilled in the art within the principle and scope of our invention as expressed in the appended claims.

The following examples are provided to further describe and illustrate the advantages of the present invention. They are in no way meant to limit the invention, the scope of which is determined in the appended claims.

EXAMPLE I

Preparation of oxytetracycline stearyl fumarate

Oxytetracycline hydrochloride, 500 grams, was dissolved, with stirring, in 2.5 liters of a 1:1 mixture of isopropanol and distilled water at 55–60° C. Sodium stearyl fumarate, 390.5 grams, was dissolved with stirring in 2.5 liters of 1:1 mixture of isopropanol and water at 70° C. and filtered through "Celite" diatomaceous earth filter aid. The clear solution of sodium stearyl fumarate, at a temperature of 65° C., was then added to the hot solution of oxytetracycline hydrochloride with vigorous agitation. A heavy crystalline precipitate of oxytetracycline stearyl fumarate compound formed. The slurry was chilled and 5 liters of ice water was added to the mixture. The mixture was stirred for one hour at 25° C. after which the crystals were recovered by filtration and washed with a 3:1 mixture of water and isopropanol. The crystals were repulped in a 3:1 mixture of water and isopropanol, filtered again and washed with additional water-isopropanol mixture. The crystals were finally washed with water and dried in vacuo at room temperature to constant weight. The yield was 811 grams of free-flowing yellow crystals of oxytetracycline stearyl fumarate, 98 percent of theory.

EXAMPLE II

The product of Example I was used to formulate a dosage form which consisted of the following materials:

| | Mg./tablet |
|---|---|
| Oxytetracycline stearyl fumarate | 260.91 |
| Sorbitol | 300.00 |
| Glycine | 200.00 |
| Sodium cyclamate | 20.00 |
| Sodium saccharin | 2.00 |
| FD&C Red No. 3, Lake | 10.00 |
| FD&C Red No. 2, Lake | 2.00 |
| Dry Imitation Cherry No. 11582 | 10.00 |
| Dry Imitation Cherry No. 55 | 3.00 |
| Magnesium stearate | 24.00 |

These ingredients were formed into tablets and the tablets were exposed to Modified Gastric Fluid with a pH of 1.2 at a temperature of 37° C. 20% dissolution of the whole tablets occurred after one hour of exposure to the Modified Gastric Fluid. Coarsely ground tablets evidenced 93% dissolution after one hour of exposure and finely ground tablets were completely dissolved after ten minutes of exposure to the Modified Gastric Fluid medium.

EXAMPLE III

Thiamine hydrochloride, 3.373 grams (0.01 mole), was dissolved in 100 ml. of methanol at 60° C. Sodium bicarbonate, 0.840 gram (0.01 mole), was added and effervescence was observed. A solution of monostearyl fumaric acid was prepared by dissolving 3.685 (0.01 mole) of the monostearyl fumaric acid in 100 ml. of methanol at 60° C. The two solutions were combined with stirring and the mixture was cooled and filtered. The dried precipitate weighed 4.251 grams and represented a yield of 67% of thiamine stearyl fumarate.

EXAMPLE IV

A 10% solution of oxytetracycline hydrochloride was prepared by dissolving 12.5 grams (0.025 mole) of medicament in 111 ml. of distilled water, with stirring, at 50° C. A second solution was prepared by dissolving 9.2 grams (0.025 mole) of sodium monocetyl fumarate in a 1:1 mixture of isopropanol and distilled water at 50° C. The fumarate solution was added slowly, with stirring, to the oxytetracycline solution while the temperature of the mixture was maintained at 50° C. Upon completion of the addition, the mixture was allowed to cool to room temperature while being stirred. The mixture was subsequently cooled to 10° C., with stirring, after which the resultant precipitate was removed by filtration and washed with 25 ml. of a 3:1 water and isopropanol mixture and then with 25 ml. of distilled water. The precipitate weighed 19.4 grams after drying, a yield of 96%. The pH of the mother liquor was 5.2.

EXAMPLE V

Oxyphencyclimine hydrochloride, 40 grams (0.1 mole), was dissolved in 250 by. of hot methanol. A second solution was prepared by dissolving 47 grams (0.1 mole) of triethylamine stearyl fumarate in 60 ml. of hot methanol. The solutions were combined with stirring and were cooled in an ice bath. The resultant white precipitate, which formed slowly, was filtered and sucked dry. Upon drying to constant weight, the precipitate was found to weigh 45.5 grams. The mother liquors were stripped to dryness in vacuum and the resultant solids were slurried with isopropanol, filtered and dried to constant weight. The total yield of oxyphencyclimine stearyl fumarate was 62.5 grams which represented a yield of 87.3%.

EXAMPLE VI

Oxytetracycline hydrochloride, 15 grams (0.03 mole), was dissolved in 135 ml. of distilled water, with stirring at 30° C. A second solution was prepared by dissolving 10.1 grams (0.03 mole) of sodium myristyl fumarate in 90.9 ml. of a 1:1 isopropanol-water solution at 50° C., with stirring. The fumarate solution was slowly added, with stirring, at 30° C., to the oxytetracycline solution. The mixture was then stirred and allowed to cool to room temperature. The resultant precipitate was removed by filtration and washed with 50 ml. of 3:1 solution of water: isopropanol and 200 ml. of distilled water. The oxytetracycline myristyl fumarate, dried to constant weight, weighed 19.5 grams, and represented a yield of 84% of theoretical. The pH of the mother liquor was 5.7.

In the same way, the corresponding oxytetracycline lauryl fumarate is formed.

EXAMPLE VII

A solution of amphetamine sulfate was prepared by dissolving 123 grams (0.32 mole) of the medicament in 1200 ml. of water, with stirring, at 50° C. A second solution was prepared by dissolving 256 grams (0.69 mole) of sodium stearyl fumarate in 2500 ml. of 1:1 isopropanol-water solution, with stirring, at 60° C. Undissolved fumarate was removed by filtration and the cake was washed with 100 ml. of 1:1 isopropanol-water solution. The combined filtrate and wash was then added to the amphetamine solution slowly, with constant stirring, and the mixture was cooled to 25° C. The resultant precipitate was removed by filtration, washed with 3:1 water:isopropanol solution and with water and dried. It weighed 313 grams, a yield of 97%. The mother liquor was found to contain 5 grams of sodium sulfate.

EXAMPLE VIII 6-deoxy-6-demethyl-6-methylene-5-oxytetracycline hydrochloride, 50 grams (0.1 mole), was dissolved in 0.5 liter of a 1:1 mixture of water and isopropanol at 60° C., with stirring. A solution of sodium stearyl fumarate was prepared by dissolving 39 grams (0.1 mole) of this substance in 0.3 liter of 1:1 isopropanol:water, at 60° C. The solutions were combined with vigorous agitation and cooled to 0° C. A precipitate of 6-deoxy-6-demethyl-6-methylene-5-oxytetracycline stearyl fumarate formed and was separated by filtration. The filtered precipitate was washed with 900 ml. of 1:1 isopropanol-water and with water. Upon drying to constant weight in vacuum, 81.0 grams of product were recovered.

EXAMPLE IX

A solution was prepared by dissolving 38.84 grams (0.2 mole) of caffeine and 73.7 grams (0.2 mole) of monostearyl fumaric acid in 600 ml. of anhydrous isopropanol. The solution was refluxed, with stirring, at 84° C. for two hours with addition of 15 ml. of water. The reaction mixture was then allowed to cool to room temperature. A white precipitate began to form at 65° C. Filtered and dried in vacuo at 60° C., it weighed 88.9 grams, a yield off 79.0 percent.

EXAMPLE X

Caffeine stearyl fumarate was treated with Intestinal Fluid Simulated, U.S.P. for three hours. An assay of the filtered fluid by ultra-violet spectrophotometry showed complete dissolution of the caffeine.

EXAMPLE XI

A solution of streptomycin sulfate was prepared by dissolving 150 grams of the antibiotic (0.1 mole) in 400 ml. of water. A second solution of sodium stearyl fumarate (0.3 mole) was prepared by dissolving 117.15 grams of the fumarate in 2350 ml. of water at 75° C. The streptomycin solution was added to the fumarate solution and a waxy precipitate formed at once. The mixture was cooled to 15° C. in an ice bath and stirred for 45 minutes. The precipitate was filtered and washed with water. The filtrate pH was 7.6. The solid precipitate was repulped in ice water and filtered again. The filtrate, here, had a pH of 7.8. The precipitate was washed with water and dried in vacuum to constant weight. The yield was 167 grams.

EXAMPLE XII 82 grams (0.1 mole) of triacetyloleandomycin base was suspended in 400 ml. of water and 100 ml. of 1.0 N hydrochloric acid was added. The slightly turbid solution was filtered in order to clarify it. A solution of sodium stearyl fumarate was prepared by dissolving 39.05 grams (0.1 mole) in 400 ml. of 1:1 isopropanol:water at about 70° C. The fumarate solution was added to the triacetyloleandomycin solution and a heavy crystalline precipitate formed at once. The mixture was heated to 50–55° C. on a steam bath and the precipitate redissolved, almost completely. The mixture was then cooled to room temperature and filtered. The precipitate was washed with water, repulped in fresh water, refiltered and washed again with water. It was then dried under vacuum to a constant weight of 80 grams, a yield of 67.6%.

EXAMPLE XIII

A solution of α-6-deoxy-5-oxytetracycline hydrochloride was prepared by dissolving 10 grams (0.02 mole) of the antibiotic in 100 ml. of water. A second solution of sodium stearyl fumarate was prepared by dissolving 7.8 grams (0.02 mole) of the fumarate in 75 ml. of 1:1 isopropanol:water solution of 60° C. and filtering to clarify. The antibiotic solution was added to the fumarate solution, with constant stirring and a precipitate formed at once. The mixture was cooled to room temperature and then in an ice bath for 30 minutes. The mixture was filtered and the solid was washed with water, repulped in ice water, refiltered and washed again. Dried in vacuum, it weighed 13.7 grams.

We claim:
1. A salt of monoalkyl fumarate containing from about 12 to 18 carbon atoms in the alkyl group with a tetracycline compound selected from the group consisting of oxytetracycline, 6-deoxy-6-demethyl-6-methylene-5-oxytetracycline and alpha-6-deoxy-5-oxytetracycline.

2. A salt of monoalkyl fumarate containing from about 14 to 18 carbon atoms in the alkyl group with a tetracycline compound selected from the group consisting of oxytetracycline, 6 - deoxy-6-demethyl-6-methylene-5-oxytetracycline and alpha-6-deoxy-5-oxytetracycline.

3. A compound according to claim 2 wherein the monoalkyl fumarate is monostearyl fumarate.

4. A compound according to claim 2 wherein the tetracycline compound is oxytetracycline.

5. A compound according to claim 2 wherein the tetracycline compound is 6-deoxy-6-demethyl-6-methylene-5-oxytetracycline.

6. A compound according to claim 2 wherein the tetracycline compound is α-6-deoxy-5-oxytetracycline.

7. The salt of monostearyl fumarate with oxytetracycline.

8. The salt of monostearyl fumarate with 6-deoxy-6-demethyl-6-methylene-5-oxytetracycline.

9. The salt of monostearyl fumarate with alpha-6-deoxy-5-oxytetracycline.

References Cited

UNITED STATES PATENTS

| 2,988,569 | 6/1961 | Duerr et al. | 260—501.18 |
| 3,343,964 | 9/1967 | Thomas | 260—485 |
| 3,360,375 | 12/1967 | Buddemeyer et al. | 260—485 |

FOREIGN PATENTS

| 1,033,657 | 7/1958 | Germany | 260—559 |

CHARLES B. PARKER, Primary Examiner

E. J. SKELLY, Assistant Examiner

U.S. Cl. X.R.

260—112, 210, 211.3, 251, 256, 256.6, 268, 434, 559; 424—19, 177, 181, 227, 250, 251, 252, 253, 255, 283, 313